United States Patent [19]

Diefes et al.

[11] Patent Number: 5,506,588
[45] Date of Patent: Apr. 9, 1996

[54] ATTITUDE DETERMINING SYSTEM FOR USE WITH GLOBAL POSITIONING SYSTEM, AND LASER RANGE FINDER

[75] Inventors: Debra L. Diefes, Alexandria, Va.; Leopold C. Fan, Potomac; Charles E. Rodgers, St. Leonard, both of Md.

[73] Assignee: Adroit Systems, Inc., Alexandria, Va.

[21] Appl. No.: 305,963

[22] Filed: Sep. 15, 1994

Related U.S. Application Data

[63] Continuation-in-part of Ser. No. 83,267, Jun. 29, 1993, Pat. No. 5,446,465, which is a continuation-in-part of Ser. No. 77,734, Jun. 18, 1993.

[51] Int. Cl.⁶ .............................. H04B 7/185; G01S 5/02
[52] U.S. Cl. ............................................ 342/357; 455/12.1
[58] Field of Search ..................................... 342/357, 359, 342/352, 419; 455/12.1

[56] References Cited

U.S. PATENT DOCUMENTS

| | | | |
|---|---|---|---|
| 4,754,280 | 6/1988 | Brown et al. | 342/357 |
| 5,021,792 | 6/1991 | Hwang | 342/357 |
| 5,101,356 | 3/1992 | Timothy et al. | 364/449 |
| 5,185,610 | 2/1993 | Ward et al. | 342/357 |

OTHER PUBLICATIONS

Brown et al., "Interferometric Attitude Determination Using the Global Positioning System", Proceedings of 3rd Int'l Geodetic Symposium on Satellite Doppler Processing, vol. 2, Feb. 1982, pp. 1289–1302.
Lucus et al., "Attitude Determination with GPS", ION Satellite Div. Tech Meeting, Sep. 1988, pp. 85–88.
Kruczynski et al., "Using GPS to Determine Vehicle Attitude", ION Satellite Div. Tech Meeting, Sep. 1988, pp. 140–145.
R. Lucus et al., "Attitude Determination with GPS", ION GPS, Sep. 1988.
Nesbo, ION GPS "Applications of GPS Determined Attitude for Navigation", Sep. 1988.
Rath et al., "Attitude Estimation Using GPS", ION National Tech Meeting, Jan. 1989, pp. 169–178.
Kruczynski et al., ION GPS "Using GPS to Determine Vehicle Attitude USS Yorktown Test Results", 163–171.
Wells et al., "GPS: A Multipurpose System", GPS World, Jan. 1990, pp. 60–63.
Evans et al., "Platform Attitude Determination by the Use of GPS–Activities at the Naval Surface Warfare Center", ION 46th Annual Meeting, Jun. 1990, pp. 3–8.
Nesbo et al., "GPS Attitude Determination for Navigation", GPS World, Oct. 1990, pp. 37–41.
Keirleber et al., "Attitude Determination for Space Transfer Vehicles Using GPS", ION National Tech Meeting, Jan. 1991, pp. 85–101.
Ferguson et al., "Three–Dimensional Attitude Determination with the Ashtech 3DF 24–Channel GPS Measurement System", ION National Tech Meeting, Jan. 1991, pp. 35–40.
Cohen et al., "Expanding the Performance Envelope of GPS–Based Attitude Determination", Sep. 1991, pp. 1001–1010.
Mercer et al., "United States Navy Applications of a GPS Attitude and Position Measurement System", Sep. 1992, pp. 783–791.
Cohen et al., "Aircraft Applications of GPS–Based Attitude Determination", Sep. 1992, pp. 775–782.

(List continued on next page.)

*Primary Examiner*—Theodore M. Blum
*Attorney, Agent, or Firm*—Collier, Shannon, Rill & Scott

[57] ABSTRACT

An attitude determining system based upon the global positioning system is disclosed and provides dynamic, real time three-dimensional attitude, position, and time information on any vehicle in which it is located. The system works at high latitudes, and be immune to magnetic deviations, pressure, temperature, and gravity. The attitude determining system makes use of certain hardware configurations and mathematical algorithms to overcome the limitations of the prior art and eliminate errors related to the motion of the vehicle platform. When used with an integrated laser rangefinder the device is used for target or survey point geolocation.

25 Claims, 9 Drawing Sheets

OTHER PUBLICATIONS

Cannon et al., "Real–Time Heading Determination Using an Integrated GPS–Dead Reckoning System", Proceedings of ION GPS, Sep. 1992, pp. 767–773.

Cohen et al., "Two Studies of High Performance Attitude Determination Using GPS: Generalizing Wahba's Problem for High Output Rates and Evaluation of Static Accuracy Using a Theodolite", ION GPS, Sep. 1992, pp. 1197–1201.

Martin–Neira et al., "GPS Attitude Determination of Spin Stabilized Satellites", ION GPS, Sep. 1992, pp. 757–765.

Weinman et al., "Attitude Error Estimation with an Offset GPS Antenna: Concept Validation Testing" ION GPS, Sep. 1992, pp. 747–755.

Schwartz et al., "Testing a GPS Attitude System in Kinematic Mode", ION GPS, Sep. 1992, pp. 801–809.

Lu et al., "Attitude Determination in a Survey Launch Using Multi–Antenna GPS Technology", ION National Tech Meeting, Jan. 1993, pp. 251–259.

Cohen et al., "Flight Tests of Attitude Determination Using GPS Compared Against an Inertial Measurement Unit", National Tech Meeting, Jan. 1993, pp. 579–587.

Martin–Neira et al., "Using GPS to Determine the Attitude of a Spacecraft", GPS World, Mar. 1993, pp. 49–66.

Laser Atlanta, Mapping And Surveying Products, ProSurvey 1000™ Laser Rangefinder.

5,506,588

ATTITUDE DETERMINING SYSTEM FOR USE WITH GLOBAL POSITIONING SYSTEM, AND LASER RANGE FINDER

GOVERNMENT RIGHTS

This invention was made with Government support under Contract No. DTRS-57-92-C-00127 awarded by the United States Department of Transportation, Transportation System Center and Contract No. DACA76-92-C-0033 awarded by the United States Army. The Government has certain rights in this invention.

This application is a continuation-in-part of U.S. patent application Ser. No. 08/083,267, filed Jun. 29, 1993, now U.S. Pat. No. 5,446,465, which is a continuation-in-pan of U.S. patent application Ser. No. 08/077,734, filed Jun. 18, 1993.

BACKGROUND OF THE INVENTION

1. Field of the Invention

This invention relates generally to use of the Global Positioning System ("GPS") for providing navigational information to afloat, airborne, or ground based vehicles. The invention more particularly relates to a Global Positioning System having an Attitude/Azimuth Determining System for providing a vehicle with accurate position, velocity, time, attitude, heading, pitch, and roll information.

2. Description of the Background Art

The Global Positioning System ("GPS") was conceived, developed, and deployed by the United States Department of Defense over ten years ago. The GPS' purpose was to provide air, ground, and naval users with precise position and time information. Although principally conceived for military purposes, the GPS also includes a band of signals designated for non-military use. These non-military signals can be used advantageously in numerous private and commercial applications. For example, the GPS can be used by commercial airlines and private pilots to accurately and quickly ascertain their location. Similarly, both commercial shippers and private boatmen can use the GPS at any time to accurately determine their position without the need for conventional points of reference such as the magnetic poles.

The GPS is a series of 24 satellites orbiting the earth. The satellites are deployed in twelve hour orbits, and are dispersed in six orbital planes. These satellites continuously emit electronic signals—telemetry—which are received by ground based or other terrestrial receivers. By simply receiving the signal from four or more orbiting GPS satellites, a properly configured receiver can accurately determine its position. This system has tremendous benefits over other positioning systems in that it relies upon no visual, magnetic, or other point of reference. These advantages are particularly important in applications such as aviation and naval navigation which traverse polar regions where conventional magnetic navigational means are rendered less effective by local magnetic conditions.

The GPS system has many advantages over standard positioning systems which it replaces. The GPS is available 24 hours a day on a worldwide basis. There is no signal degradation, or loss of quality of positioning information at higher latitudes. Magnetic deviations and anomalies common in standard positioning systems do not exist. Typical GPS systems are fabricated of standard, solid state electronic hardware, resulting in a low cost, low maintenance system having few or no moving parts and requiring no optics. The GPS does not require calibration, alignment, and maintenance such as conventional inertial measuring units. Further, normal GPS operation provides positioning with accuracies of about 100 meters for non-military uses. Military users can make use of encryption keys which yield position information within 10 meters.

Notwithstanding these advantages, there are still significant deficiencies in the capabilities of the GPS. For example, in naval applications, the GPS is incapable of providing information related to attitude, direction of travel, roll, and pitch. GPS can inform the navigator of a ship that the ship is within 100 meters from running aground, but does not provide the ship with its direction of travel and attitude which are required to avoid running aground.

Prior art attempts to provide for attitude information in the GPS have encountered problems. These problems include the inability to measure the whole carrier cycles between two antennae that form an interferometric baseline. The L1 GPS carrier frequency has a wavelength or cycle length of about 20 cm. Therefore, a baseline formed by two antennae separated by one meter can have 11 (+5 to −5) permutations of whole GPS L1 carrier cycles depending on the angle between the baseline and the line of sight vector to the GPS satellite. GPS receivers cannot measure these whole cycles, but only measure the difference in fractional phase between the antennae. If four satellites are required to calculate the three dimensional attitude of that baseline, there are $11^4$ possible combinations. Previous attempts to resolve this problem have focused on either exhaustive searches of all possible combinations or informed searches of the most likely integer counts. These methods are too cumbersome or unreliable for real-time navigation instruments.

The industry lacks an attitude determining system for use in conjunction with the GPS which permits navigation, hydrographic and land survey, buoy positioning, vehicle alignment, and pointing vector determination, among other attitude determining applications.

SUMMARY OF THE INVENTION

The invention is a system for employing telemetry and other electronic signals provided by a series of orbiting satellites to determine attitude, direction of travel, pitch, and roll of a platform on which the system is located. The system includes an antenna array means having at least two discrete antennae. The antenna array collects the telemetry and electronic signals transmitted by the series of orbiting satellites. The invention has a receiver means electrically communicating with each of the discrete antenna and interprets telemetry and electronic signals collected by the antenna array means. The invention has a mathematical algorithmic comparing means for (1) comparing data received from each said receiver means, (2) calculating attitude, heading, pitch, and roll absent determining whole carrier cycles between antennae, and (3) reducing errors inherent in the received telemetry and electronic signals. The invention also has a processor means for processing said information and determining the attitude, heading, pitch, and roll of the platform.

OBJECT OF THE INVENTION

The invented attitude determining system is used in conjunction with the GPS which permits navigation, hydrographic and land survey, buoy positioning, vehicle alignment, and pointing vector determination, among other attitude determining applications. The attitude determining system does not suffer from signal degradation at high latitudes and is not affected by gravity or by magnetic, pressure, or temperature deviations. The attitude determining system is easily assembled at low cost, is modular for easy replacement of components, requires no calibration, has no moving parts, and only requires low maintenance. The system stands independent from any specific receiver, single board computer, or other hardware component and works cooperatively with a range-finding device, such a laser range finding device, to target or otherwise geolocate an object.

DETAILED DESCRIPTION OF THE INVENTION

Figure 1:
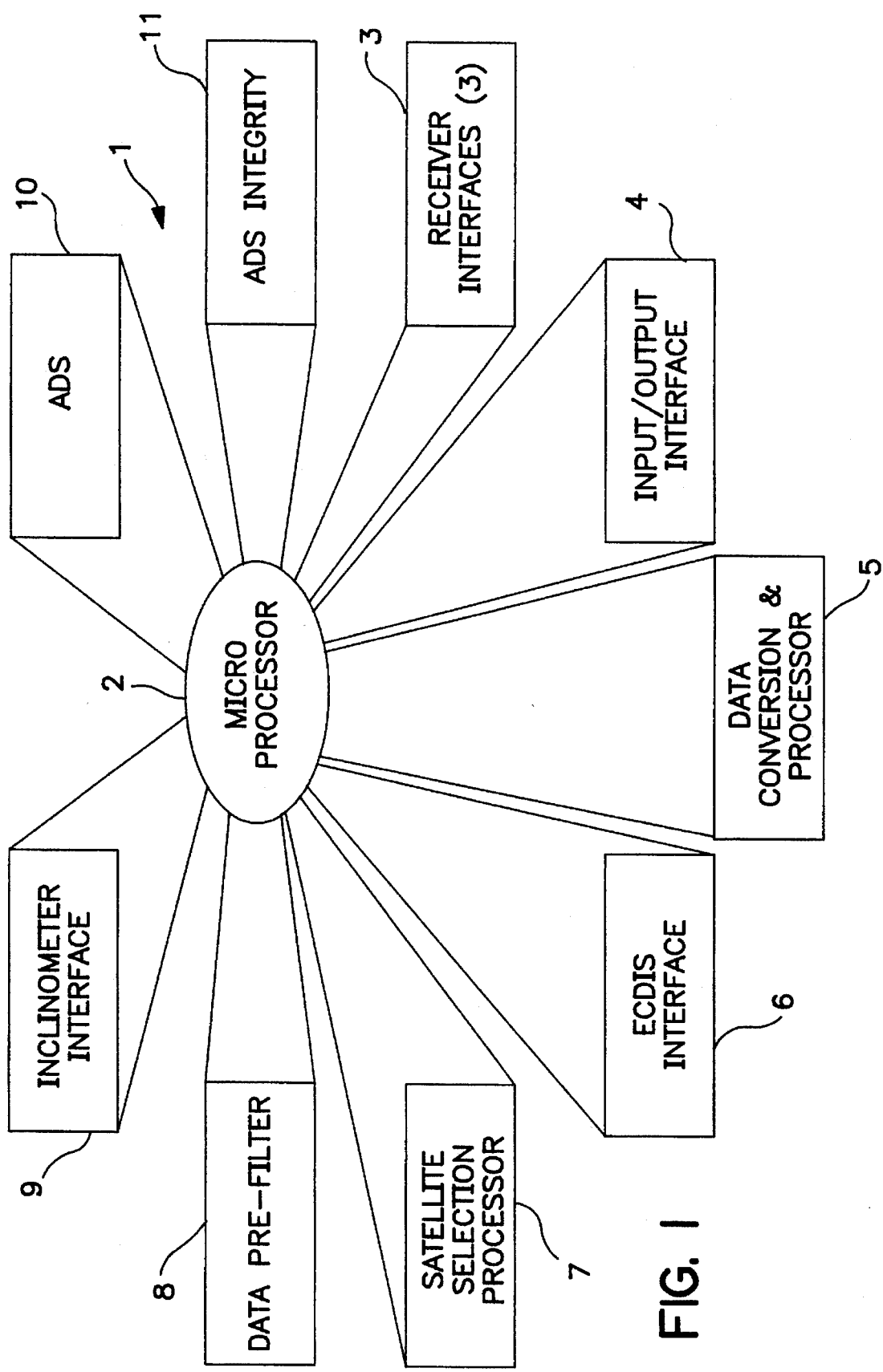
FIG. 1 is a block diagram illustrating the elements of the attitude determining system.

The invention is a system for employing telemetry and other electronic signals provided by a series of orbiting satellites. The invention performs an informed search in the "solution space" of attitude which includes azimuth, elevation, and roll absent integer cycle counts. The invention models a fractional carrier phase of a likely attitude and compares the model to the measured fractional phases. When all likely attitudes are compared, the one that matches the measured data best is selected as the solution. Integer cycle counts are never considered or calculated. Working in the attitude solution space confers additional system benefits. These benefits include the ability to limit the search space with aiding devices (inclinometers, digital compasses, inexpensive inertial systems), short, relatively inaccurate GPS antenna baselines, and operational constraints. It is also easy to change the resolution of the search to match the intended system accuracy. This ability permits a more efficient real-time operating device.

The invention also resolves carrier phase measurement error. This resolution improves attitude and azimuth accuracy. Phase measurement error and attitude accuracy can be represented by the following equation:

$$\text{AZIMUTH ACCURACY} = AZDOP * \frac{1}{L} * PE$$

where
PE=phase error [mm]
L=baseline length [mm]
AZDOP (Azimuthal Dilution of Precision) is a figure of merit used to quantify the quality of information received from a set of satellites due to satellite geometry. The position of the satellites has a large effect on the attitude accuracy.

$$AZDOP = \sqrt{\cos^2(az) * D_{11} + \sin^2(az) * D_{22}}$$

where the matrix $$D = (RA^T AR^T)^{-1}$$

and
az=azimuth angle;
$D_{ii}$=the iith element of the D matrix;
A=double difference matrix operator which ensures independence in R; and
R=matrix of receiver to satellite vectors.

The phase error factor (PE) is the sum of several phase error inducing mechanisms. It can be expanded as follows:
PE=ADPE+RPME+MP+EPL
where
ADPE=antenna differential phase error due to antenna phase center migration and signal interaction with the baseplane;
EPL=electrical path length difference;
RPME=the GPS receiver phase measurement error (the accuracy to which the receiver can measure phase); and
MP=multipath (the reception of signals reflected off of objects in the antenna's environment) induced phase errors.

The use of this equation overcomes the inability of GPS to provide attitude related information, combined with accuracy problems attributable to, for example, phase measurement error, which severely limit utility of the GPS.

The attitude determining system employs hardware configurations and algorithms for attitude determination and error correction to create a more efficient system than is available with GPS alone. The attitude determining system makes use of carrier phase interferometry to determine the attitude.

The hardware configurations referenced above include a GPS signal receiving antenna array. In a first desirable embodiment of the invention, three antennae are arranged in two collinear baselines. One baseline is relatively long, for example, 0.85 meters, and one baseline is relatively short, for example, 0.14 meters. This configuration provides a two-dimensional attitude showing heading and pitch. A second embodiment consists of three antennae arranged in an equilateral triangle, the sides of which are approximately 0.17 meters in length. The triangular base plane provides a three baseline configuration. The three baseline configuration adds a dimension of attitude which allows the attitude determining system to solve for a three dimensional attitude in heading, pitch, and roll. The distance between the antennae is important and is, desirably, related to the wavelength of the GPS signal of 0.1902 meters.

Information or data collected by the antenna array from the orbiting GPS satellites must be assimilated and corrected for errors. The attitude determining system includes an algorithm which, among other functions, reduces errors from phase measurements before calculating attitude. The attitude solution is initiated by checking the phase measurements for characteristics that indicate measurement errors. Satellite signals that exhibit these characteristics are not used in the solution if enough signals from "good satellites" are available. One check is for signal strength as quantified by code-to-noise-ratio ("$C/N_o$"). A weak satellite signal causes phase measurement errors because the GPS receiver cannot track the weak signal properly. Inconsistent signal strength at the multiple antennae can indicate "multipath" errors. Multipath errors occur when a signal is reflected off an object or surface in the antenna environment before entering the antenna. This "indirect signal" is out of phase with the direct signal from the same satellite that the system is attempting to measure. Another check for multipath phase errors compares the change in the range to the satellite as measured by GPS code with the change in the carrier count. Multipath causes greater changes in the code range than the range inferred from the carrier.

Once the "bad signals" are eliminated, a rough attitude accurate to within 10 to 30 degrees is calculated from all satellites in view. With that rough estimate the device selects the best satellite constellation—the four GPS satellites from which telemetry reception is best—as a function of the geometry between the rough baseline vector and the positions of the entire constellation of GPS satellites with good signals. Using double differencing of carrier phase measurements from among the three antenna baselines, attitude is determined to within ±0.5 degrees. Accuracy is a function of the distance between antennae or the "baseline length" and is expected to be accurate within 0.05 degrees for baselines on the order of two meters. The algorithm is further adapted to eliminate or reduce errors due to fixed and drifting electrical path lengths to the antennae. The algorithm also contains an Antenna Differential Phase Error ("ADPE") correction table to reduce errors due to phase center migration. The ADPE correction table is developed by measuring and calibrating the antennae in a controlled laboratory environment. The ADPE correction table is also used to correct phase measurement based on the incident angle of the satellite signal.

The attitude determining system of the instant invention is based on carrier phase interferometry of GPS signals to measure the signal arrival time difference between two closely separated antennae. Carrier phase interferometry refers to measuring the difference in the time that it takes a satellite signal to be received by two or more antennae spaced a known distance apart. By using the GPS satellite signal time of arrival difference, it is possible to measure which antenna is closer to each satellite. This phase difference can be used to calculate an angle between each satellite and the antenna baseline. These angles are combined with the position of each satellite and the attitude determining system to calculate the baseline attitude. Since the signal receiver provides the attitude determining system position as well as the satellite positions, it is possible to convert the satellite angles into a single attitude vector. This conversion can be calculated as follows:

Differential Phase ($\Delta\phi$) measured by a signal receiver and the angle between a baseline vector (x) and the vector to satellite (i)($r_i$) is $\Theta$.

$$\Theta_i = \cos^{-1}(\Delta\phi_{(i)}/L)$$

$$\Psi = \begin{bmatrix} \cos(\Theta_1) \\ \cdot \\ \cdot \\ \cdot \\ \cos(\Theta_{sat}) \end{bmatrix} \quad \text{and } R = \begin{bmatrix} r_1 \\ \cdot \\ \cdot \\ \cdot \\ r_{Nsat} \end{bmatrix} \quad \text{then } R\underline{x} = \Psi$$

and the baseline vector can be calculated as:

$$\underline{x} = (R_T R)^{-1} R_T \Psi.$$

The attitude determining system configuration can also be used in conjunction with other attitude measuring instruments. For example, an on-board inertial navigation system can be used as a back-up to, or an aid for, the attitude determining system in determining an initial attitude estimate, thereby reducing the solution space and resulting in a reduction in the processing time necessary to determine the attitude of the vehicle.

A preferred embodiment of the invention which is intended to accomplish at least some of the foregoing objects includes an attitude determining system of the instant invention comprising at minimum the following: processor means, such as a conventional microprocessor as in a laptop, portable, or single board computer; an antenna array for collecting telemetry and other electronic signals from orbiting GPS satellites; receiver means for receiving and interpreting information collected by said antenna array and for determining location, time, and velocity; an attitude determining mathematical algorithm loaded in the processor means for determining attitude and for screening and eliminating errors from the telemetry received from the satellites. In another embodiment, the attitude determining system includes means for measuring the incline (i.e., pitch and roll) of a vehicle carrying the attitude determining system. Input/output devices, such as a keyboard or touch sensitive liquid crystal display, are also required to provide a user interface.

FIG. 1 illustrates a block diagram of the elements of a preferred embodiment of the attitude determining system of this invention. The attitude determining system employs both hardware components and an algorithm. The hardware components and algorithm determine attitude, location, and direction of travel and reduce errors attributable to, for example, phase measurement error, encountered in conventional GPS. Thus, the algorithm and hardware configuration of the present invention create a more efficient system than available with conventional GPS alone.

The attitude determining system generally includes a processor means, such as a conventional microprocessor, an antenna array for collecting telemetry and other electronic signals from orbiting GPS satellites; receiver means for receiving and interpreting information collected by the antenna array and for determining location, time, and velocity; a mathematical algorithm stored in the processor means for determining attitude and for screening and reducing errors from the telemetry received from the satellites; and, in some embodiments, means for measuring the incline (i.e., pitch and roll) of a vehicle carrying the attitude determining system.

FIG. 1 illustrates the relationship between the different processes and the mathematical algorithm that comprise the attitude determining system 1. Each block represents a process designed to interact with the attitude determining system microprocessor, including processes to retrieve data from hardware, filter and convert data, interface with various input/output devices and perform the attitude determination, and integrity algorithms. The attitude determining system includes a microprocessor 2 with an embedded real-time operating system designed to control each discrete process, such as software sold under the tradename PSOsystem or other software operating systems known in the art. Receiver interfaces 3 electrically communicate with the microprocessor 2, and control and retrieve data from a plurality of receivers. The attitude determining system 1 includes preferably, three receivers as illustrated in greater detail below in FIGS. 2 and 9. The attitude determining system 1 also includes an input/output interface 4 such as a lap-top computer interface. Input/output interface 4 provides a way for the attitude determining system user to input information into, and extract information from, the attitude determining system 1. The input/output interface 4 also allows a user to set different parameters, such as dynamic conditions, data logging requirements, or satellite selection, depending upon the particular application of the attitude determining system.

The attitude determining system further includes a process for converting all input/output data into an electronic language specific to a particular user application. For example, in FIG. 1, the attitude determining system includes a data conversion processor 5 for converting data into preselected National Marine Electronic Association ("NMEA") sentences. This electronic language is standard in certain naval applications, such as those applications used by the United States Coast Guard. In addition, the attitude determining system includes an interface 6 for enabling the attitude determining system to communicate and provide data to an external interface, such as an Electronic Chart Display and Information System ("ECDIS") on a ship. The translation processes accomplished by the data conversion processor 5 and the interface 6 are performed by software loaded into microprocessor 2. Such software is commercially available.

The attitude determining system 1 further includes a processor for a mathematical algorithm, which comprises a plurality of discrete steps as described below for FIGS. 5 and 6. In the first step, a data pre-filter 8, receives data from the hardware components of the system, such as the receivers, inclinometers, a range finding device, such a laser range finder, and the Electronic Chart Display and Information System, and sends the data to the appropriate data processors for further processing. The data pre-filter 8 also performs calculations to determine if the measured data is usable. The data pre-filter 8 also converts satellite ephemeris data into earth-centered, earth-fixed coordinates (i.e., X, Y, Z coordinates with the origin of the earth's center). An inclinometer interface 9 reads the data collected by the inclinometers or range-finders periodically, such as once per second. In the next step, a satellite selection processor 7 determines which four satellites, from among all satellites visible at a given time, will be used in the attitude determining system algorithm. The attitude determining system can, at any time, receive information from up to ten GPS satellites. The satellite selection processor 7 selects the four best satellite signals available.

The attitude determining system ("ADS") algorithm processor 10 compiles data collected from the receivers and other sources of information, such as the input/output information and the inclinometers or laser range-finder, and computes the attitude of the platform and, if appropriate, the distance from the platform to the targeted object. The attitude determining system integrity processor 11 uses various measures of signal quality and satellite constellation quality to generate a quality measurement of the integrity of the attitude determining system calculation.

Figure 2:
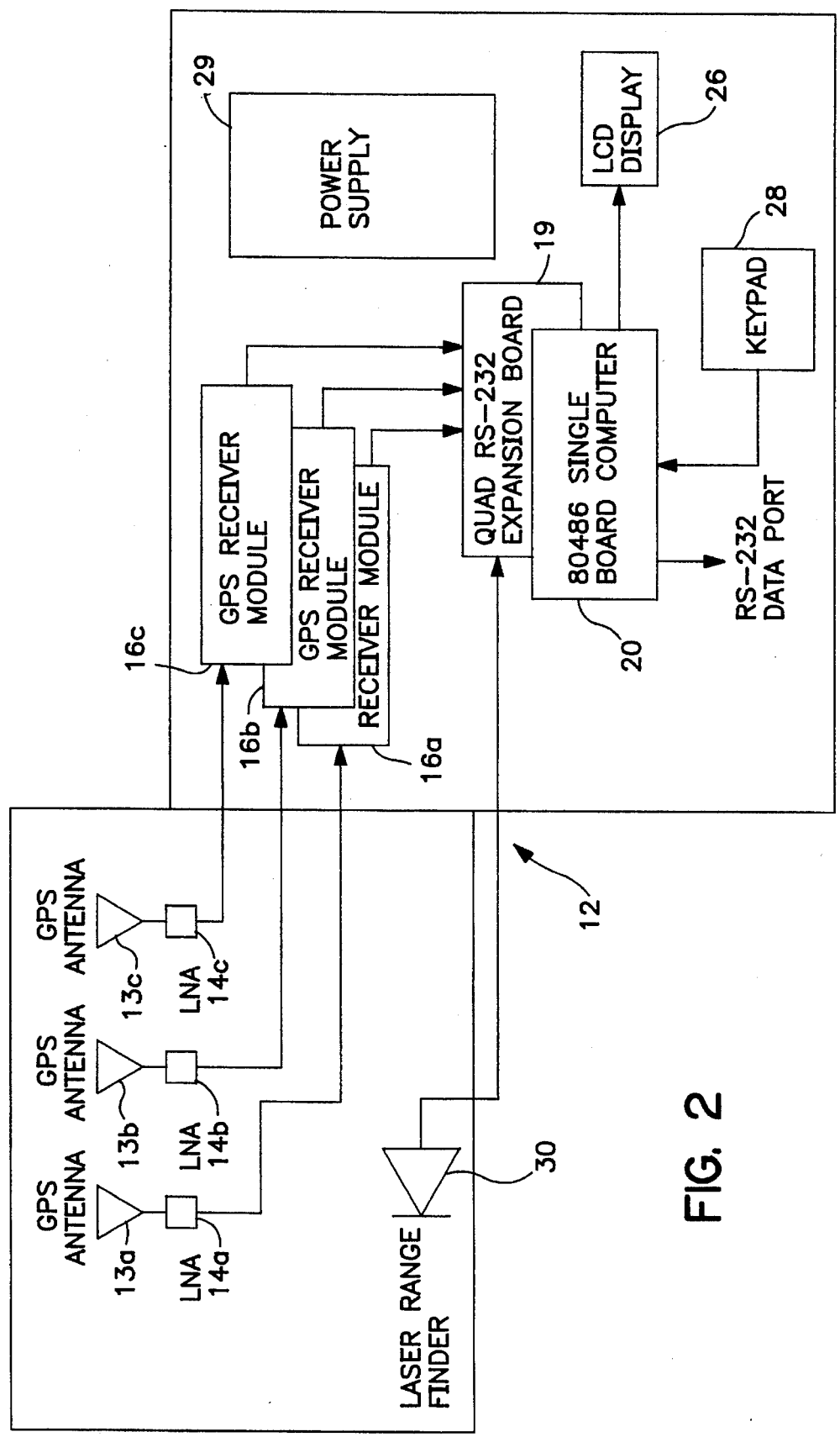
FIG. 2 is a block diagram illustrating the relationship between the various elements of the attitude determining system.

FIG. 2 illustrates the relationship of the hardware components required for the attitude determining system. An antenna array assembly 12 houses an array of more than one, and preferably at least three antennae 13a, 13b, and 13c. The antenna array assembly 12 collects telemetry and other electronic signal information from orbiting GPS satellites. Antenna array assembly 12 can also include preamplifiers 14a, 14b, and 14c. Preamplifiers 14a, 14b, and 14c improve the signal-to-noise ratio of incoming collected information from the GPS satellites.

The signals received by antennae 13a, 13b, and 13c are transmitted to GPS receivers 16a, 16b, and 16c. Receivers 16a, 16b, and 16c collect and decode signal data from antennae 13a, 13b, and 13c such as carrier phase information, ephemeris data, almanac data, and pseudorange data. Receivers 16a, 16b, and 16c electrically communicate with an expansion board 19 and a central processing unit 20, relaying collected information for processing. The central processing unit 20 can be an off-the-shelf microprocessor or single board computer equipped with a standard real-time operating system. The central processing unit 20 can be, for example, a conventional 80386 or 80486 microprocessor. The operating system of the central processing unit 20 employs the algorithm to perform the attitude, error reducing calculations, and target location as described below with respect to FIGS. 5, 6, and 8. The central processing unit 20 contains software to perform functions such as data conversion, user interface, memory management, and other conventionally known "housekeeping" functions, as described above with respect to FIG. 1, for a particular user application.

At least one additional or auxiliary information source, such as a laser range-finder or inclinometer, can also communicate with the central processing unit 20. For example, a desirable embodiment of the invention incorporates a range finder, such as a laser range-finder. The laser range finder can be used to accurately measure the distance from the ADS platform to an object. By combining the position and heading information provided from the ADS/GPS system with the distance information supplied from the laser range-finder, it is possible to accurately geolocate the precise position of a target object.

In addition, the central processing unit 20 can electrically communicate with a user interface device 26, such as a liquid crystal display. The keypad 28 enables a user to request certain information from the central processing unit 20 or to enter specific instructions relating to algorithm parameters. A power supply 29 supplies the necessary power to operate the attitude determining system 1.

Figure 3A:
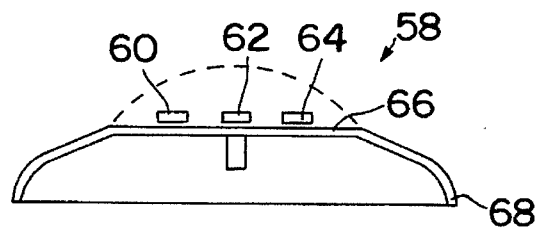
FIGS. 3a and 3b are side and top plan views respectively of a first antenna array unit illustrating the relationship of the three discrete antennae arranged in a triangular configuration.
Figure 3B:
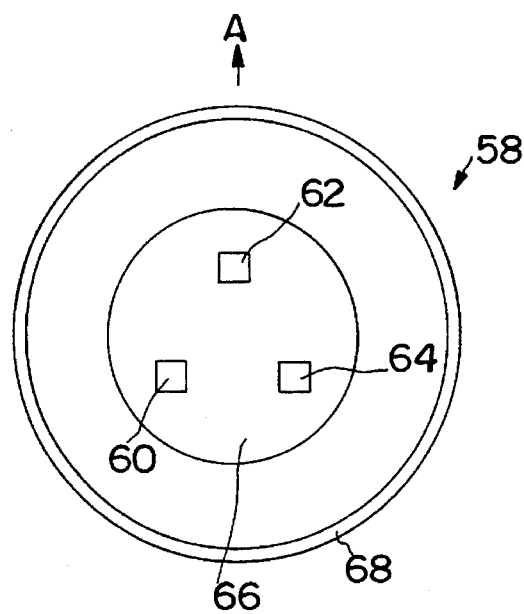

FIGS. 3a and 3b illustrate a side view and a top plan view of an antenna array 58 of the invention. The antenna array 58 includes three discrete antennae 60, 62, and 64. The antenna array 58 further includes an antenna ground plane 66 adapted to reduce multipath and antenna differential phase errors. The antenna ground plane 66 of this embodiment of the invention is circular with a rounded flanged edge 68. The rounded flanged edge 68 preferably has a radius of one-fourth of the carrier wavelength, i.e., approximately 0.05 meter. The antenna ground plane 66 is also adapted to minimize antenna phase center error. The discrete antennae 60, 62, and 64 are arranged in the circular antenna ground plane 66 such that the antennae 60, 62, and 64 are equidistant from the edges of the antenna ground plane 66. This configuration reduces antenna differential phase error. In a preferred embodiment, the antenna array 58 is fabricated of machined aluminum to assure a smooth surface. The antenna array 58 is mounted on a vehicular platform, for example, a naval vessel, such that arrow A points toward the front of the vehicular platform.

Figure 3C:
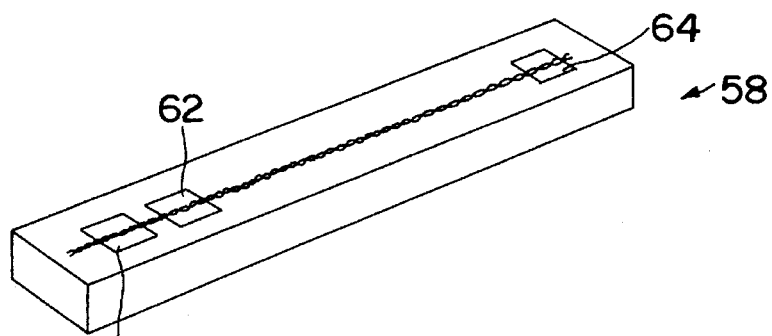
FIG. 3c is a perspective view of a second antenna array unit illustrating the relationship of three discrete antennae arranged in a two base-line configuration.

The antennae 60, 62, and 64 are conventional GPS antennae, such as Ball Communication Systems Division Model No. AN496C. In the preferred embodiment of the invention, the three antennae 60, 62, and 64 are arranged in an equilateral triangle. In an alternative embodiment of the invention, the length of each side of the equilateral triangle is approximately 0.17 meters. In another embodiment of the invention illustrated in FIG. 3c, the antennae 60, 62, and 64 of the antenna array 58 are arranged in a "two baseline configuration." One baseline of this embodiment is relatively long or approximately 0.85 meters and is defined by the distance between the two most distant from one another antennae 60 and 64. The second baseline is relatively short or approximately 0.14 meters and is defined by the distance between the two least distant from one another antennae 60 and 62.

Figure 4:
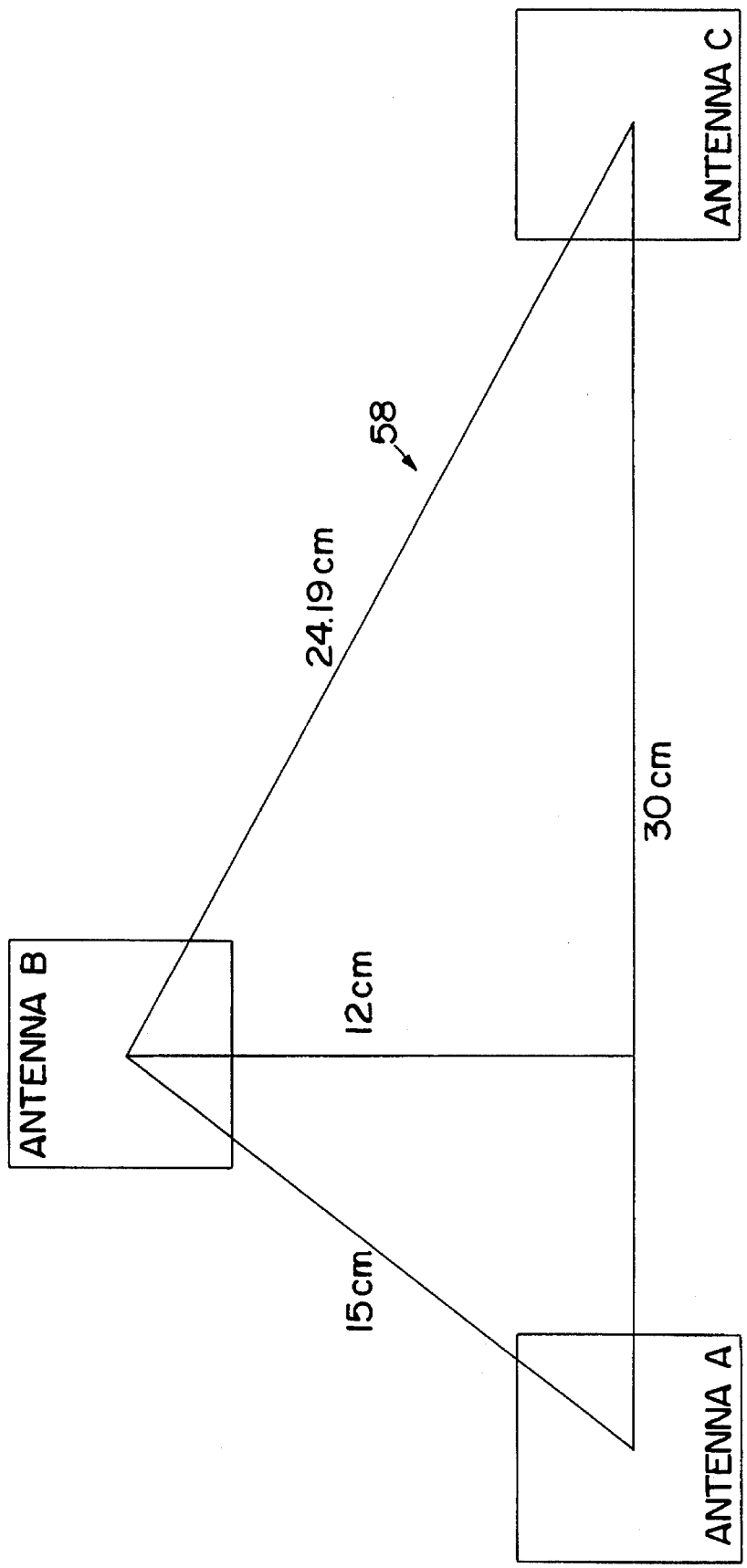
FIG. 4 is a top view of another antenna array unit for a hand-held target location device illustrating a nonequilateral triangle configuration.

FIG. 4 illustrates an embodiment of the invention with a triangular arrangement for the antenna array 58 with sides of unequal length. The unequal sides provide a compact array for hand-held devices. Other configurations of antennae array are possible and can be advantageously utilized for a particular application. The antenna array can further include other elements, such as pendulum elements for correcting for pitch and roll of the antenna array 58 when it is mounted on, for example, an afloat vehicle.

Figure 5:
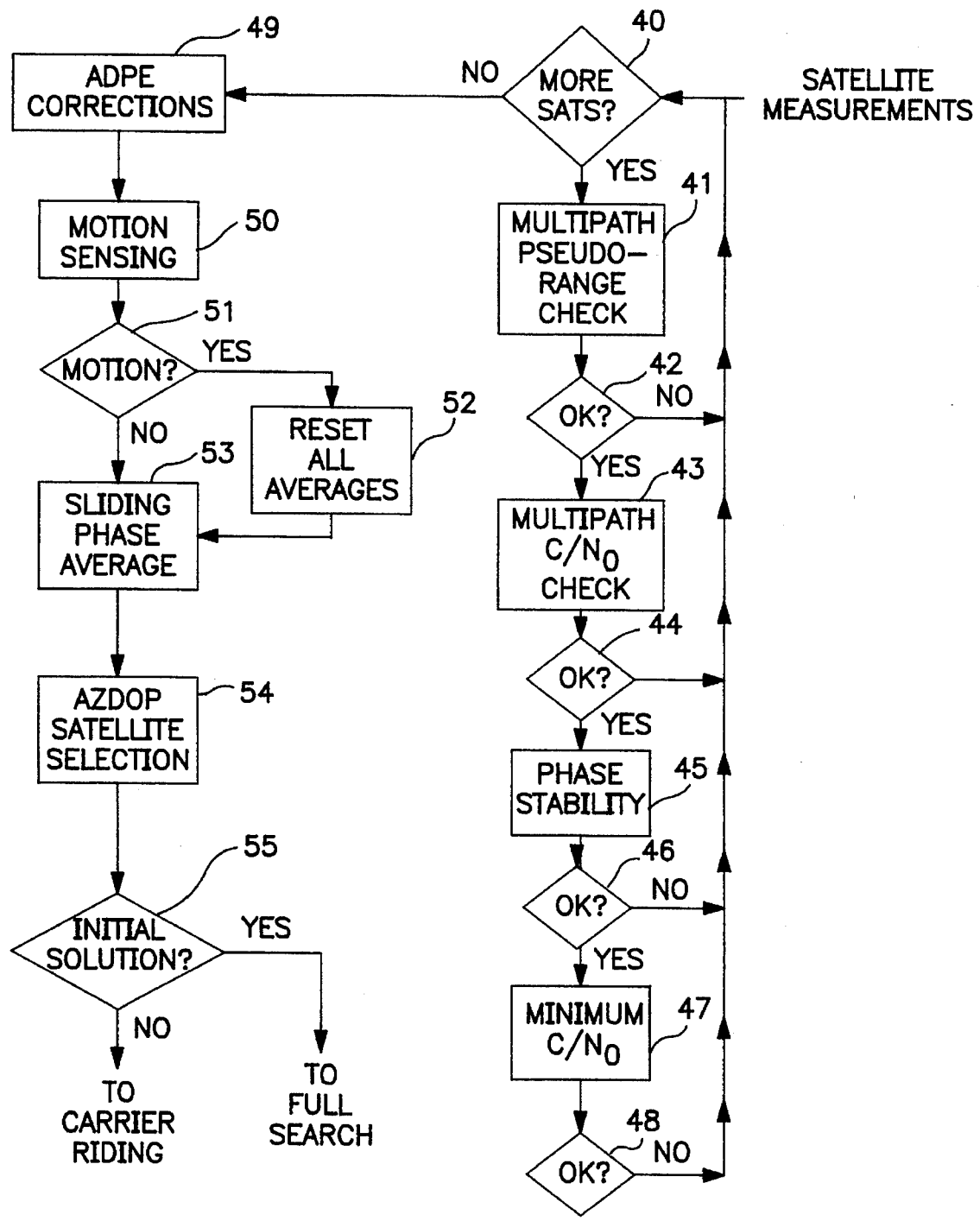
FIG. 5 is a flow diagram illustrating an algorithm to reduce GPS carrier phase measurement error.
Figure 6:
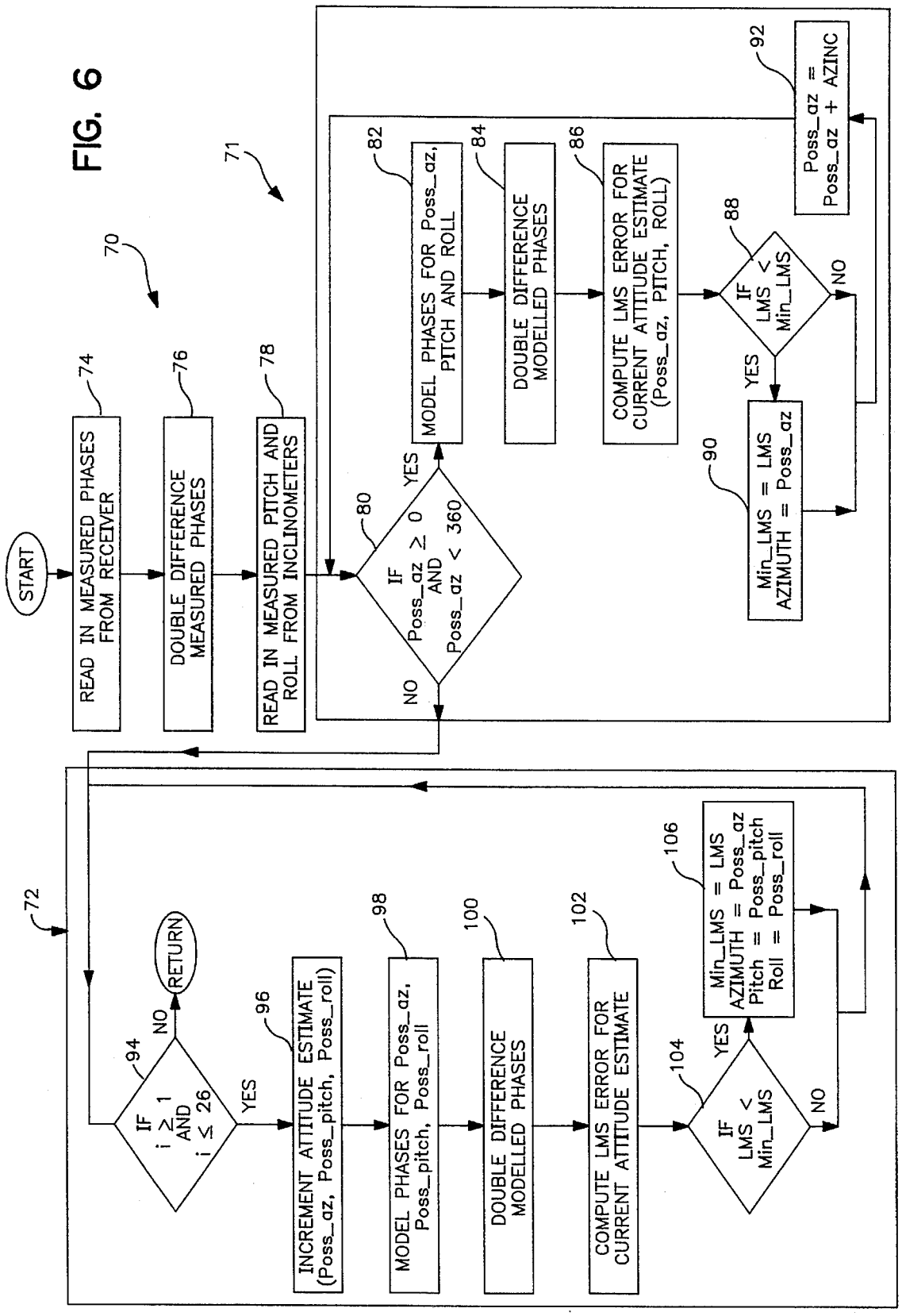
FIG. 6 is a flow diagram illustrating an attitude determining algorithm.

FIGS. 5 and 6 are flow diagrams illustrating the attitude determining algorithm of the invention. The algorithm includes three main components, namely, a data filter for phase measurement error reduction having steps 40 through 55, a coarse search 71 having steps 80 through 92, and a fine search 72 having steps 94 through 106. As noted above, the attitude determining system algorithm operates in the central processing unit 20. In general, both the coarse search 71 and the fine search 72 select a number of search attitude estimates and model the single differenced phase measurement for each attitude estimate. Each search has a designated methodology for selecting each trial attitude. The errors between the modeled and measured phases are calculated for each estimate. The attitude estimate with the minimum error is selected as the attitude solution.

Prior to the start of the coarse search 71, data is analyzed for the measured phases from receivers 16a, 16b, and 16c as indicated by FIG. 5. Prior to calculating attitude, these algorithms must first select the best "satellite constellation" or the four GPS satellites from which telemetry reception is best from among the entire constellation of GPS satellites available. The phase is first measured for each satellite signal at each receiver as illustrated in step 40. Those carrier phases are then single differenced. Single differencing refers to analyzing the difference in the phases of the carrier waves between two antennae along an antenna baseline. Single differencing the phase measurements removes satellite clock errors, some multipath errors, and errors caused by selective availability. The single differenced measurements are then checked to assure the integrity of the measurement. In FIG. 5, the first check is step 41 for multipath induced phase errors. Pseudorange to the satellite is derived from code phase instead carrier phase. A large change in the difference between carrier derived range and code derived range indicates multipath and the measurement is rejected. Step 43 represents another multipath check. If the signal strength varies significantly at each antenna, the variation is an indication of multipath and the measurement is rejected. Step 45 determines if the change in single difference phase between two epochs is greater than expected. A large difference indicates an unstable measurement and is rejected. Step 47 checks the signal for adequate strength to produce good phase measurements. A measurement from a weak signal is rejected. The resulting good measurements are corrected for phase errors caused by the baseplane and antenna assembly. This Antenna Differential Phase Error ("ADPE") correction is represented by step 49. Step 50 represents a motion sensing module. If the attitude of the baseplane is changing, the change is determined by the single difference phase of all satellites at all receivers. Running averages of phase measurements are produced when the baseplane is not in motion. These averages represented by step 53 reduce random noise on the phase measurements. When step 50 detects motion, the phase average (step 53) is reset. Step 54 represents the selection of the optimum satellite constellation based on a figure of merit for constellation geometry called azimuthal dilution of precision ("AZDOP"). This selection is made from the satellite measurements that were not earlier rejected.

FIG. 6 illustrates the system once it proceeds to the solution searches. The selected good measurements are then single differenced and double differenced. Single differencing refers to analyzing the difference in the phases of the carrier waves between two antennae along an antenna baseline. Single differencing the phase measurements removes satellite clock errors, some multipath errors, and errors caused by selective availability. The single differenced results are then differenced again between satellites, yielding a double differenced set of phases as indicated by step 76. Double differencing removes errors such as receiver clock errors, electrical path length errors, and non-synchronous receiver errors. If inclinometers are being used, the microprocessor reads data relating to pitch and roll from the inclinometers, as shown by step 78.

The following is an example of single differencing and relates to the equilateral triangle configuration illustrated in FIG. 3b and the associated receivers:

Assuming baseline 1 consists of Receiver 60 and Receiver 62;

Assuming baseline 2 consists of Receiver 60 and Receiver 64;

Assuming baseline 3 consists of Receiver 62 and Receiver 64;

$$\alpha_i 1 = \phi_{i60} - \phi_{i62}$$

$$\alpha_i 2 = \phi_{i60} - \phi_{i64}$$

$$\alpha_i 3 = \phi_{i62} - \phi_{i64}$$

where i=1 to N, and N is the number of satellites, and $\phi_{ix}$=Phase measurements from satellite "i" at Receiver X, where X=60, 62, or 64.

The single differencing measurement is then:

$$\phi = \begin{matrix} \alpha_{i1} & \alpha_{i2} & \alpha_{i3} \\ \cdot & & \cdot \\ \cdot & & \cdot \\ \cdot & & \cdot \\ \alpha_{N1} & \alpha_{N2} & \alpha_{N3} \end{matrix}$$

Double differencing, therefore, involves using the same calculations for multiple baseline as follows:

$$\bar{\Theta} = \begin{matrix} \beta_{11} & \beta_{12} & \beta_{1M} \\ \cdot & \cdot & \\ \cdot & \cdot & \\ \cdot & \cdot & \\ \beta_{D1} & \ldots & \beta_{DM} \end{matrix}$$

where $D=(N^2-N)/2$; $j=1$ to M; M is the number of baselines; and $$\begin{aligned} \beta_{1j} &= \alpha_{1j} - \alpha_{2j} \\ \beta_{2j} &= \alpha_{1j} - \alpha_{3j} \\ \beta_{3j} &= \alpha_{1j} - \alpha_{4j} \\ \beta_{4j} &= \alpha_{2j} - \alpha_{3j} \\ \beta_{5j} &= \alpha_{2j} - \alpha_{4j} \\ \beta_{6j} &= \alpha_{3j} - \alpha_{4j} \\ &\cdot \\ &\cdot \\ &\cdot \\ \beta_{mj} \end{aligned}$$

Thereafter, the attitude determining system performs a gross estimate of attitude, accurate to within about 10 to 30 degrees. Using double differencing of carrier phase measurements from among the three antenna baselines, attitude is determined to better than ±0.5 degrees depending on the baseline length. The coarse search 71 provides a gross estimate of the attitude with as few calculations as possible. Calculation of the attitude estimate may be illustrated by FIG. 7.

Figure 7:
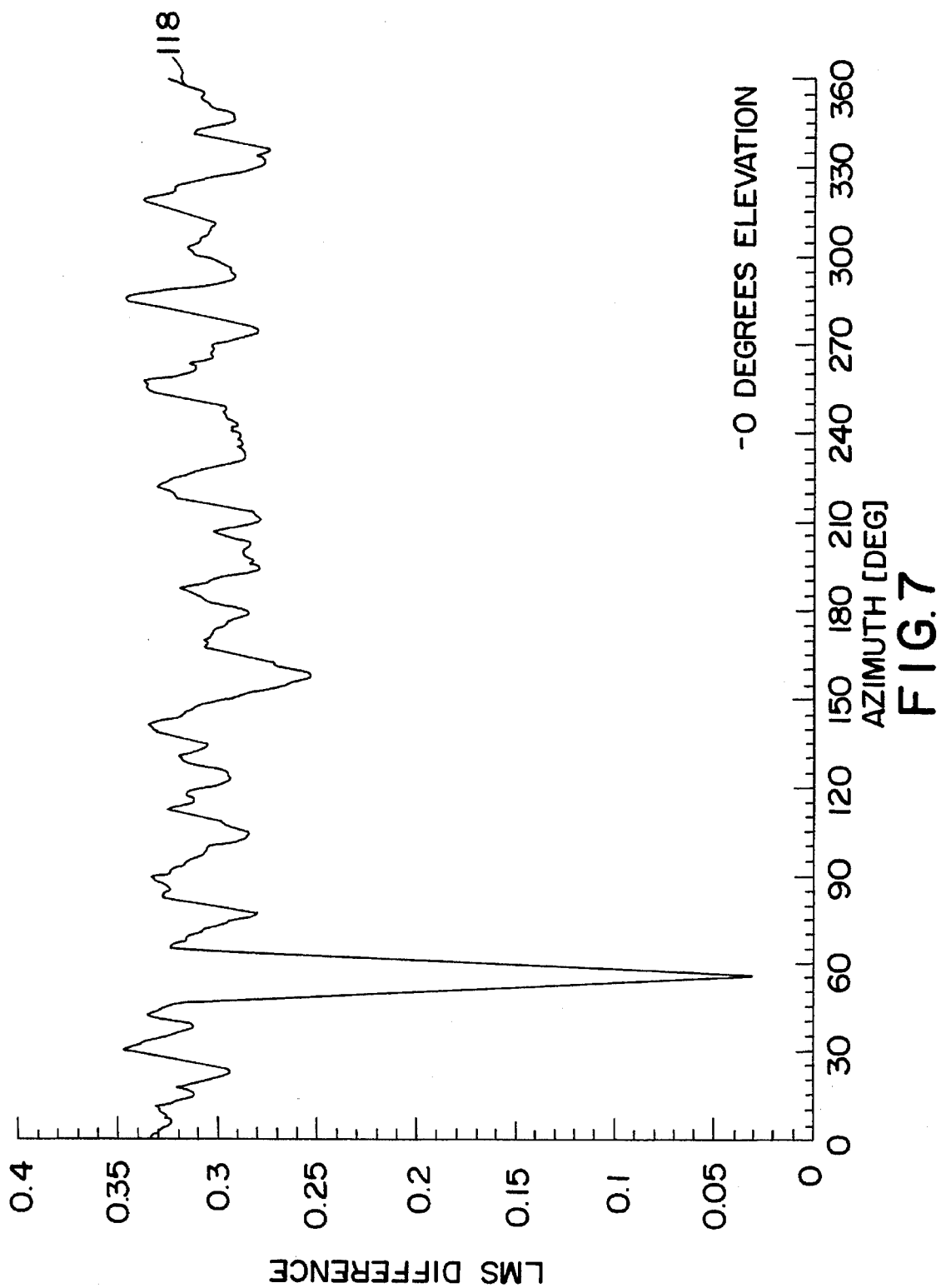
FIG. 7 is a graph of Azimuth versus LMS error and illustrates a method by which the algorithm of FIG. 4 determines attitude wherein azimuth is plotted on the abscissa and LMS error is plotted on the ordinate.

FIG. 7 illustrates an x-y coordinate graph where azimuth is plotted on the abscissa and the LMS error is plotted on the ordinate for an antenna platform pointed at 55.271° and oriented at 0° pitch and 0° roll. The course search provides an approximate azimuth that is along the global minimum of the curve 118.

The coarse search 71 of FIG. 6 provides an estimate of the accuracy of the modeled phases for each of the trial attitude estimates by means of the least root squared error. The least root squared errors are calculated by comparing the measured and modeled double differenced phases. The lowest point on the curve 118 represents the estimate having modeled phases that are closest to the measured phases.

More specifically, the coarse search 71 models the phases at selected attitude estimates to determine the rough attitude of the vehicular platform. The estimates are selected in an incremental fashion about a solution space. It is preferable to limit the solution space using information such as a previous attitude solution or measurements from the pitch and roll inclinometers, if present. A user of the attitude determining system can select the particular estimate increment which can range from 1° to 30°. In FIG. 5, for example, if the pitch and roll measurements were each 0.5°, the solution space can be constrained to:

$0° \leq \text{Azimuth} \leq 360°$ $0° \leq \text{Pitch} \leq 1°$ (0.5° inclinometer accuracy assumed)

$0° \leq \text{Roll} \leq 1°$ (0.5° inclinometer accuracy assumed).

Then, if the increment was 10°, the azimuth estimate is approximately equal to 50°. If the inclinometers are not used, the previous solution attitude is to be used to constrain the pitch and roll dimensions to + and – the increment from the previous pitch and roll.

FIG. 6 illustrates the specific steps of the coarse search 71. The first step of the coarse search 71 is step 80. Step 80, limits the search range in the coarse search 71. In this example, step 80, limits the search range from:

$0° \leq \text{azimuth} \leq 360°$ $0° \leq \text{pitch} \leq 1°$ $0° \leq \text{roll} \leq 1°$ Step 82 models the single difference phases for the attitude estimate. The next step 84 performs double difference calculations for the modeled phases. Next, step 86 computes error for the attitude estimates. The modeled phases are then compared to the measured phases. Steps 88 and 90 compare the calculated error for each of the attitude estimates and, if the current estimate has the least error—in other words, the modeled phase is most like the measured phases—it is kept for the current "best estimate". Step 92 then adds an increment to the current estimate so that the next estimate proceeds through the steps in steps 80 through 86. If this estimate has a lower error than all of the previous ones, it then becomes the "best estimate". Once all of the estimates and the solution space have been tried, the algorithm passes to the fine search 72.

In the fine search, step 94 serves as a counter to ensure that all of the estimates closest to the current "best estimate" are tried. Step 96 then increments the "best estimate" according to the index of the counter to determine the value of the current estimate to be modeled and tried. Next, the single differenced phases for the attitude estimates are modeled as shown by step 98. Step 100 indicates the next step which involves performing the double difference calculations for the modeled phases single differenced in step 98. Once this calculation is performed, the error for the attitude estimates is calculated, as indicated by step 102. The modeled phases are compared to the measured phases. As indicated by step 104, the calculated error for each of the attitude estimates is compared, and if the current estimate has the least error (modeled phases that are most like the measured phases) it is kept for the current "best estimate". The "best estimate" calculations are indicated in step 106. After the "best estimate" of the trials is determined, the process goes through a second iteration, until the next "best estimate" is found. This process continues until no other "best estimates" are obtained after going through an entire iteration. Step 106 stores the current best estimates.

The purpose of the fine search 72, is to accurately determine attitude/azimuth to 0.5° or greater accuracy. The iterations in the fine search calculate the global minimum of curve 118 of FIG. 5. In the example in FIG. 5, the fine search calculates a minimum of 345°, starting from a course search estimate of 350°. The fine search also models phases at selected attitude estimates, but the way in which the estimates are selected differs in the fine search. The search tries a number of the closest attitude estimates to the current "best estimate" to model. For example, if the current "best estimate" is (350°, 0.5°) and 0.5° for azimuth, pitch, and roll), and the interval size was 2°, then 26 estimates would be shown as follows:

EXAMPLE 26 trials for 1 increment of the Fine Search assumes current "best estimate" is (350°, 0.5°, 0.5°), and search interval is 2°

| | | |
|---|---|---|
| (350°, −0.91°, 1.91°) | (350°, 0.5°, 2.5°) | (350°, 1.91°, 1.91°) |
| (350°, −1.5°, 0.5°) | (350°, 0.5°, 0.5°) | (350°, 2.5°, 0.5°) |
| (350°, −0.91°, −0.91°) | (350°, 0.5°, −1.5°) | (350°, 1.91°, −0.91°) |
| (348°, −0.91°, 1.91°) | (348°, 0.5°, 2.5°) | (348°, 1.91°, 1.91°) |
| (348°, −1.5°, 0.5°) | (348°, 0.5°, 0.5°) | (348°, 2.5°, 0.5°) |
| (348°, −0.91°, −0.91°) | (348°, 0.5°, −1.5°) | (348°, 1.91°, −0.91°) |
| (352°, −0.91°, 1.91°) | (352°, 0.5°, 2.5°) | (352°, 1.91°, 1.91°) |
| (352°, −1.5°, 0.5°) | (352°, 0.5°, 0.5°) | (352°, 2.5°, 0.5°) |
| (352°, −0.91°, −0.91°) | (352°, 0.5°, −1.5°) | (352°, 1.91°, −0.91°) |

The size of the increment utilized in the fine search is dependent on the size of the error. The object is to minimize the number of iterations of the search, so the interval size depends on how close the estimates are to the final solution. For example, a larger error would require a larger interval between the estimates and, as the search spirals in on the solution, the interval gets progressively smaller. Phase modeling, as in steps 96 and 98 of fine search 72 is then conducted as follows:

Sample Calculation for Phase Modeling

Given an attitude estimate (AZ, EL, RL), compute AZ and EL for each baseline as follows:

1. Calculate a local pointing vector.

$$x_i = \cos(AZ_i)\cos(EL_i)i + \sin(AZ_i)\cos(EL_i)j + \sin(EL_i)k$$

where i=1 to M and M=the number of baselines

2. Transform the vector measurements into global earth-centered, earth-fixed ("ECEF") coordinates.

$$X_i = x_i \, LR^T$$

where $x_i$=3×1 matrix, which is the local pointing vector of baseline "i";

$X_i$=3×1 matrix, which is the ECEF vector of baseline "i";

LR=3×3 matrix, which is the transformation matrix from local to ECEF coordinates; i=1 to M; and M=the number of baselines.

Multiply $X_i$ by the receiver to satellite vectors (R) to get the single differenced phrase divided by the carrier phase wavelength ($\lambda$=0.1902 m).

$$RX_i = \frac{1}{\lambda} \Theta_i$$

where R=(N×3) matrix of Rx to satellite vectors and N=the number of satellites, and $\Theta_i$=the $i^{th}$ column of the $\Theta$ matrix and i=1 to M and M=the number of baselines.

Thereafter, the attitude determining system algorithm computes for error, as illustrated in step 102 of fine search 72, as follows:

$$LMS \text{ error} = \sum_{i=1}^{D} \sum_{j=1}^{M} (\overline{\beta}ij - \beta ij)$$

where $\overline{\beta}ij$ is the $i^{th}$ row, $j^{th}$ column element of the $\overline{\Theta}$ matrix derived from the measured phases, and $\beta ij$, is the ith row, jth column element of the $\overline{\Theta}$ matrix derived from the modelled phases from the given attitude estimate (AZ, EL, RL).

In this manner, the algorithm illustrated in FIG. 6 compares information received from receivers to determine the attitude of a vehicle carrying an attitude determining system. The system repeats these calculations continuously to yield constantly updated attitude information.

Figure 8:
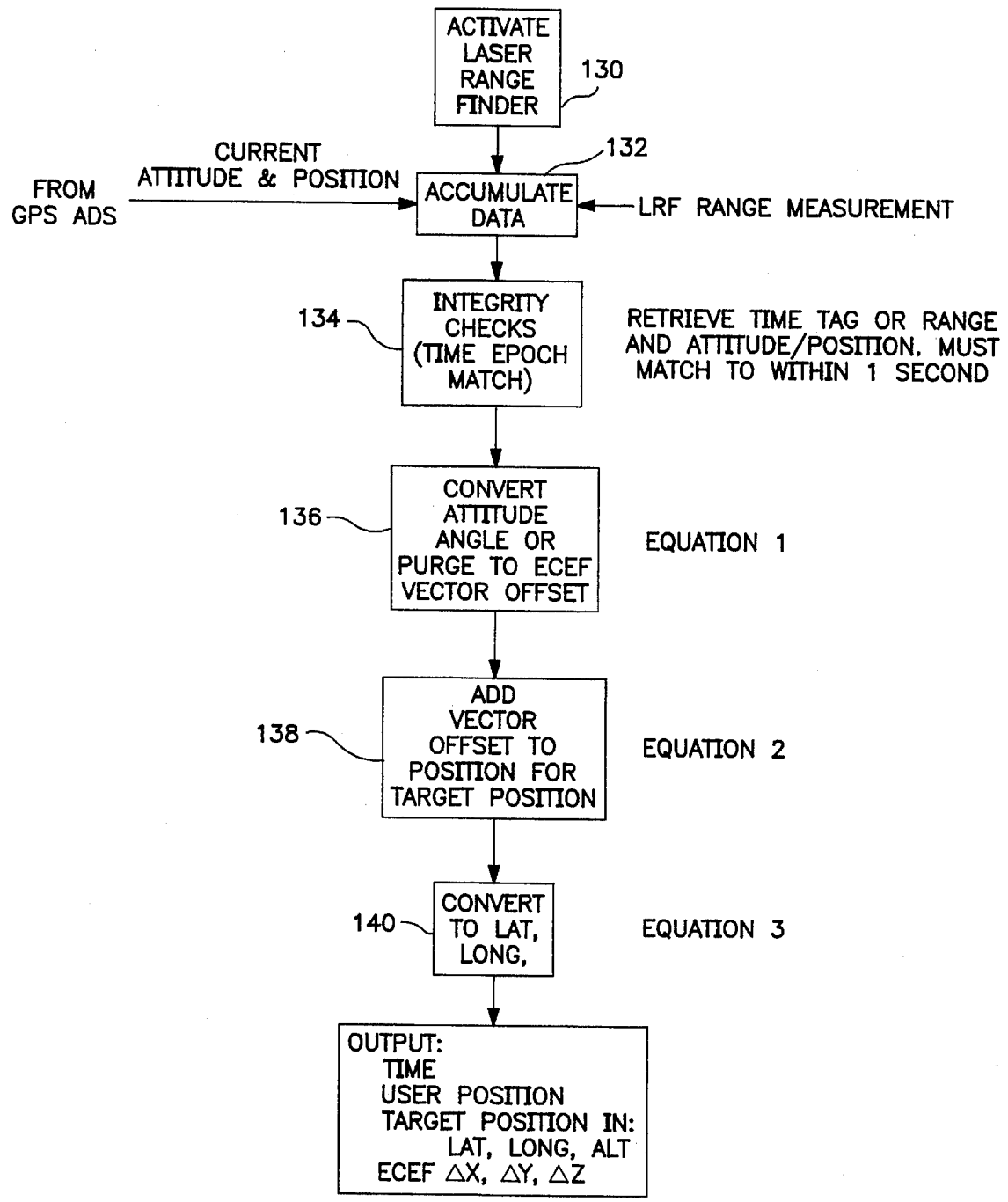
FIG. 8 is a flow diagram illustrating a target location algorithm.

Once the baseplane attitude is determined, that information can be combined with the distance to a target as measured by a laser range finder to calculate the location of the target. FIG. 8 is a flowchart showing the target location software process. The central processing unit 20 of FIG. 2 activates the laser rangefinder as indicated in step 130 of FIG. 8. The laser rangefinder range to the target and the current baseplane pointing vector are collected by the processor as indicated in step 132. The processor checks the two data streams to ensure a temporal match as indicated in step 134. Well known algorithms are used to convert the measurements in a local coordinate frame to a vector to the target in Earth Centered Earth Fixed ("ECEF") coordinate system as shown in step 136. The position of the target is determined by adding this vector to the ECEF position of the invention determined by standard GPS techniques in the GPS receivers. This target coordinate determination is represented as step 138 of FIG. 8. Then the ECEF coordinate of the target can be converted to latitude and longitude using well known equations as represented by step 140. The results are then communicated to the user through the selected output device.

Figure 9:
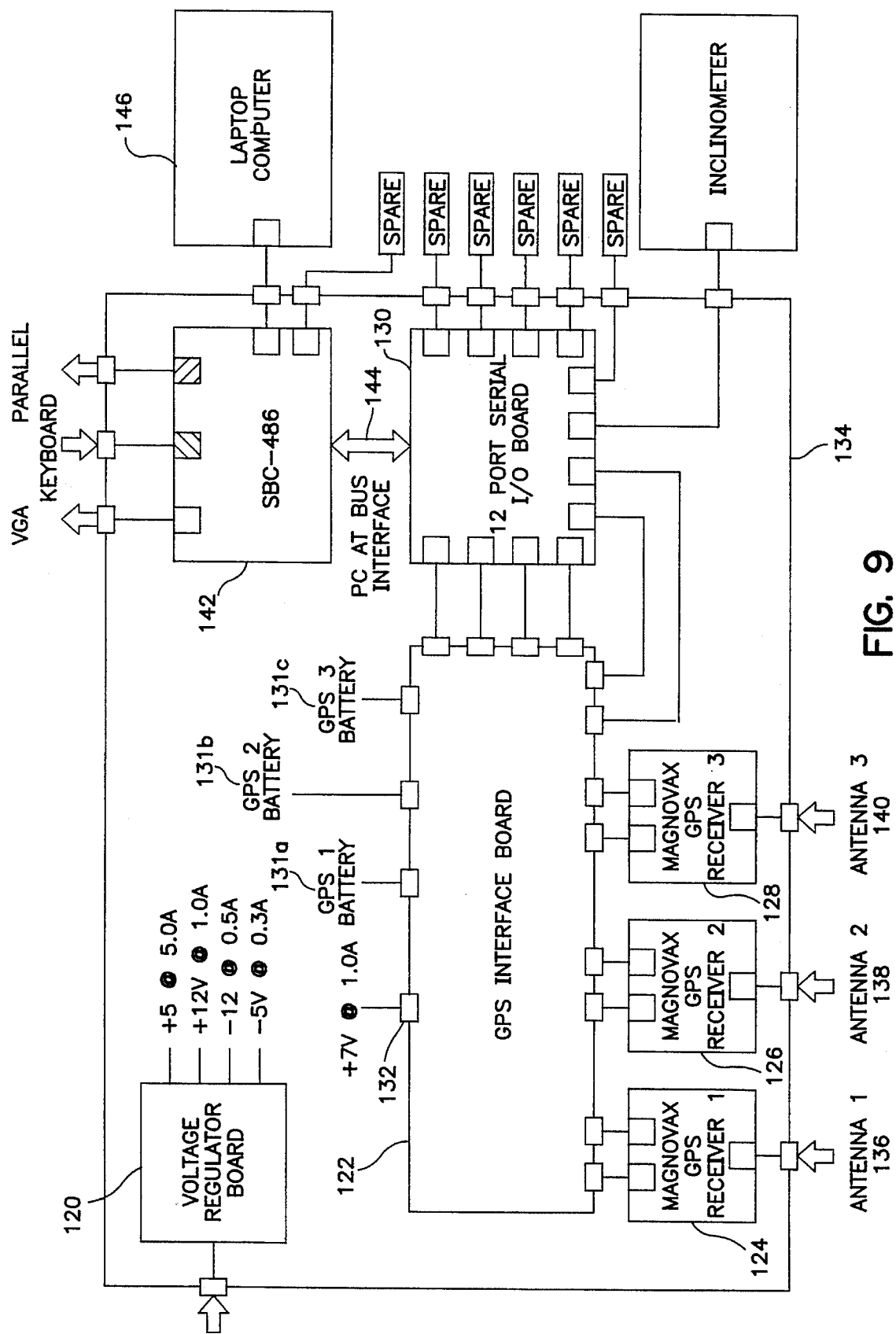
FIG. 9 is a circuit diagram of the major components of the attitude determining system including a microprocessor means, receiver boards, converter boards, expansion boards, and input/output means interface units.

FIG. 9 illustrates a circuit diagram of the major components of the attitude determining system. The attitude determining system includes a voltage regulator board 120 which provides power to the attitude determining system. In a preferred embodiment, the voltage regulator board 120 accepts between 12 to 32 volts DC and converts this voltage into the following four voltages: +5 V at 5.0 A, +12 V at 1.0 A, −12 V at 0.5 A, and −5 V at 0.3 A. The attitude determining system also includes an interface board 122 which electrically connects receivers 124, 126 and 128 to an input/output board 130. Driver chips (not shown) such as commonly available RS232 driver chips, are preferably provided on board 122 to allow interfacing with the input/output board 130. The interface board 122 also includes backup batteries 131a, 131b, and 131c to allow receivers 124, 126, and 128 to store their almanac data after the attitude determining system has been turned off.

The interface board 122 also generates any specialized voltages which are required to operate the attitude determining system. For example, the receivers 124, 126, and 128 preferably comprise Magnavox GPS receivers and require +7 V at 1.0 A which can be provided to the interface board 122 via connector 132 in a manner commonly known in the art.

The receivers 124, 126, and 128 are integrated into a chassis 134. The receiver boards 124, 126 and 128 collect all of the data required to perform attitude calculations. The antennae 136, 138, and 140 electrically communicate with the receivers 124, 126, and 128, respectively, and are attached via, for example, coaxial cables, to the chassis 134. In a preferred embodiment, antennae are Three Ball AN496C antennae and are mounted as depicted in FIG. 3.

The interface board 132 electrically communicates with the input/output board 130. The input/output board 130 preferably consists of 12 serial ports which can interface with receivers, inclinometers, and other hardware components of the attitude determining system. The input/output board 130 electrically communicates with a microprocessor 142 via a bus interface 144. The microprocessor 142 also receives electrical signals from an external computer 146 corresponding to instructions entered into the computer 146 by a user. The microprocessor 142 is adapted to perform the algorithm illustrated in FIGS. 5, 6, and 8.

We claim:

1. A system for employing telemetry and other electronic signals provided by a series of orbiting satellites to determine attitude, direction of travel, pitch, and roll of a platform on which said system is located, said system comprising:

antenna array means comprising at least two discrete antenna, said antenna array means is adapted to collect said telemetry and electronic signals transmitted by said series of orbiting satellites;

receiver means electrically communicating with each said discrete antenna and adapted to interpret telemetry and electronic signals collected by said antenna array means;

mathematical algorithmic comparing means for comparing data received from each said receiver means, calculating said attitude, heading, pitch, and roll information absent determining whole carrier cycles between antennae, and reducing errors inherent in said received telemetry and electronic signals, wherein said algorithmic comparing means further includes a satellite selection regime for selecting one or more preferred satellites from among said series of orbiting satellites; and microprocessor means for processing said information and determining the attitude, heading, pitch, and roll of the platform.

2. A system as defined in claim 1 and further comprising:

means for establishing orientation of said system wherein said mathematical algorithm comparing means compares information received from said receiver means without determining the unknown whole carrier cycles between antennae and said orientation establishing means to reduce error.

3. A system as defined in claim 2, wherein said means for establishing orientation comprises at least one inclinometer.

4. A system as defined in claim 1, and further comprising:

input/output means for receiving input by a user and electronically transmitting said input to said microprocessor means to enable a user to interact and define parameters of said system.

5. A system as defined in claim 4, wherein said input/output means can comprise a touch-sensitive liquid crystal display or keypad and standard liquid crystal display.

6. A system as defined in claim 1, and wherein said antenna array means further comprises:

three antennae arranged in a triangular configuration, each of said antennae forming a baseline with another of said antennae.

7. A system as defined in claim 6, wherein said three antennae are arranged on a ground plane in an equilateral triangle.

8. A system as defined in claim 7, wherein a length of each side of said equilateral triangle is less than a wavelength of up to two meters of telemetry and electronic signals provided from said orbiting satellites.

9. A system as defined in claim 7, wherein said antenna ground plane is substantially circular in shape and has a rounded flanged edge; and said antennae are arranged in said circular ground plane such that said antennae are substantially equal distance from said edge of said ground plane.

10. A system as defined in claim 1, wherein said antenna array means further comprises three discrete antenna arranged in two co-linear baselines.

11. A system as defined in claim 1, wherein said mathematical algorithmic comparing means further includes coarse attitude determining means for determining a first, general attitude with accuracy between about plus/minus 30 degrees, and a fine attitude determining means for improving accuracy of said first, general attitude to between about plus/minus 0.05 degrees to 0.5 degrees depending on a baseline length.

12. A system as defined in claim 11, wherein attitude is determined by carrier phase interferometry absent a determination of the unknown number of whole carrier cycles between the antennae.

13. A system as defined in claim 12, wherein said attitude is determined by double differenced, carrier phase interferometry.

14. A system as defined in claim 1, further comprising means for collecting information from auxiliary sensing units.

15. A system as defined in claim 14, wherein said auxiliary sensing units determine a distance from a platform on which said attitude determining system is located to a spacedly disposed object.

16. A system as defined in claim 15, wherein said auxiliary sensing units include a laser range finder.

17. A method of determining location, attitude, and direction of travel information from signals transmitted from at least one earth orbiting satellite, said method comprising the steps of:

providing a collecting and receiving means for telemetry and other electronic signals transmitted at a preselected wavelength from said at least one earth orbiting satellite, said collecting and receiving means comprising at least three antennae, each antenna electrically communicating with a receiver;

providing a microprocessor means for performing an algorithm, said algorithm employing carrier phase interferometry without carrier ambiguity resolution to interpreting said received telemetry and electronic signals, said algorithm comprising:

satellite selection means embedded in said microprocessor and adapted to select at least four satellites from among the plurality of orbiting satellites from which to receive telemetry; and error correcting means embedded in said microprocessor to reduce errors inherent in said received telemetry and electronic signals;

relaying information received by said antennae and receiver to said microprocessor for calculation of attitude, location, and direction of travel information by said algorithm; and displaying attitude, location, and direction of travel information on an output device.

18. A method as in claim 17, including the further step of calculating said attitude, location, and direction of travel by employing double differenced carrier phase interferometry without carrier cycle ambiguity resolution.

19. A method as in claim 17, including the further step of providing said three antennae arranged in an equilateral triangle, the distance between each antenna being less than a wavelength of said transmitted telemetry signal.

20. A method as in claim 17, including the further steps of establishing a first, course measurement of attitude, with accuracy between about plus/minus 30 degrees, and subsequently establishing a second, fine measurement of attitude improving the accuracy of said first determination to between about plus/minus 0.05 degrees to 0.5 degrees depending on the chosen baseline lengths.

21. A method as in claim 17, wherein the output means comprise a touch sensitive liquid crystal display, a standard serial data port, or a keypad and standard liquid crystal display.

22. A method as in claim 17, including the further step of arranging said antennae in two co-linear baselines.

23. A method as in claim 17, including the further step of collecting information from auxiliary sensing units.

24. A method as in claim 23, wherein said auxiliary sensing units determine a distance from a platform on which said attitude determining system is located to a spacedly disposed object.

25. A method as in claim 23, wherein said auxiliary sensing units include a laser range finder.

* * * * *